United States Patent [19]

Becker et al.

[11] 4,353,939

[45] Oct. 12, 1982

[54] PROCESS FOR THE MANUFACTURE OF TUBING BASED ON CELLULOSE HYDRATE HAVING A COATING ON ITS INSIDE AND APPARATUS FOR CARRYING OUT THE PROCESS

[75] Inventors: Reinhold Becker, Wiesbaden; Heinz Kälberer, Walluf; Richard Regner, Mainz, all of Fed. Rep. of Germany

[73] Assignee: Hoechst Aktiengesellschaft, Frankfurt am Main, Fed. Rep. of Germany

[21] Appl. No.: 247,933

[22] Filed: Mar. 26, 1981

[30] Foreign Application Priority Data

Mar. 28, 1980 [DE] Fed. Rep. of Germany ....... 3012251

[51] Int. Cl.³ .......................... B05D 1/40; B05D 7/22
[52] U.S. Cl. .................................. 427/238; 427/230; 427/394; 118/18; 118/20; 118/44; 118/56; 118/105; 118/106; 118/117; 118/DIG. 10; 118/408; 428/36; 426/135; 426/138; 138/118.1
[58] Field of Search ............... 427/177, 230, 238, 394, 427/398.1; 118/18, 20, 26, 44, 56, 67, 105, 106, 117, DIG. 10, 408; 426/135, 138; 138/118.1

[56] References Cited

U.S. PATENT DOCUMENTS

| 2,210,436 | 8/1940 | Weingand et al. |
|---|---|---|
| 2,901,358 | 8/1959 | Underwood et al. ............... 138/118 |
| 2,901,358 | 8/1959 | Underwood et al. |
| 3,378,379 | 4/1968 | Shiner et al. ............... 138/118 |
| 3,378,379 | 4/1948 | Shiner et al. |
| 3,413,169 | 11/1968 | Krings et al. |
| 3,451,827 | 6/1969 | Bridgeford ............... 427/230 |
| 4,233,341 | 11/1980 | Hammer et al. |
| 4,287,217 | 9/1981 | Hammer et al. |

FOREIGN PATENT DOCUMENTS

| 1081033 | 7/1980 | Canada . |
|---|---|---|
| 1545 | 5/1979 | European Pat. Off. . |
| 733205 | 1/1945 | Fed. Rep. of Germany ...... 427/135 |
| 1786517 | 8/1972 | Fed. Rep. of Germany . |
| 2557994 | 8/1978 | Fed. Rep. of Germany . |
| 2512994 | 3/1979 | Fed. Rep. of Germany . |
| 2512995 | 4/1979 | Fed. Rep. of Germany . |
| 2659000 | 7/1979 | Fed. Rep. of Germany . |
| 2801038 | 7/1979 | Fed. Rep. of Germany . |
| 2856253 | 7/1980 | Fed. Rep. of Germany . |
| 984026 | 2/1965 | United Kingdom . |
| 1201830 | 8/1970 | United Kingdom . |

Primary Examiner—Shrive P. Beck
Attorney, Agent, or Firm—Schwartz, Jeffery, Schwaab, Mack, Blumenthal & Koch

[57] ABSTRACT

Disclosed is a process for coating the inside of a length of tubing comprising the steps of forming at least one loop of tubing with a downwardly inclined portion and an upwardly inclined portion; filling the cavity of the tubing forming the loop with a coating liquid; transporting the tubing along its longitudinal axis in a substantially vertically upward direction to coat the inside surface of the tubing above the level of the coating liquid with an initial layer of coating liquid; constricting the tubing adjacent to and above the level of the coating liquid with a metering device having a constriction zone which flattens a portion of the tubing passing therethrough to substantially eliminate all of the initial layer thereon and partially flattens the remaining portion of the tubing to allow a desired quantity of coating liquid to remain on the tubing issuing from the constriction zone; filling the cavity of the tubing issuing from the constriction zone with support gas; and, exposing the tubing to the action of heat at a sufficiently high temperature to fuse the coating layer to the inside thereof and form an uninterrupted film. Also disclosed is an apparatus for carrying out the process.

29 Claims, 2 Drawing Figures

4,353,939

PROCESS FOR THE MANUFACTURE OF TUBING BASED ON CELLULOSE HYDRATE HAVING A COATING ON ITS INSIDE AND APPARATUS FOR CARRYING OUT THE PROCESS

BACKGROUND OF THE INVENTION

The present invention generally relates to a process for the manufacture of tubing made from cellulose hydrate with a coating on its inside, and an apparatus for carrying out the process, and more particularly to a process for the manufacture of tubular packaging sheaths made from cellulose hydrate having, on the inside, a uniformly thick, uninterrupted film coating of a natural or synthetic polymer which is virtually impermeable to water and water vapor, and to an apparatus for carrying out the process.

The invention also relates to the use of the products manufactured by the processes according to the invention as a packaging sheath, in particular for pasty foodstuffs, more especially as a synthetic sausage skin for sausage intended to be boiled or cooked.

British Pat. No. 1,201,830 describes a process for the internal coating of tubular packaging sheaths, made from cellulose hydrate, with an aqueous polymeric dispersion, in which the cellulose hydrate tubing is continuously passed horizontally through the nip of a vertical pair of nip rolls and is thereafter deflected into the vertical direction by means of a deflecting roller. The cavity of the portion of tubing issuing from the nip of the pair of nip rolls contains a certain amount of aqueous polymeric dispersion as a coating liquid. The vertically running tubing is exposed to heat above the level of the quantity of coating liquid enclosed in the cavity of the tubing.

In a process, described in U.S. Pat. No. 2,901,358, for the internal coating of cellulose hydrate tubing with an aqueous polymeric solution, the tubing to be coated, in flattened form, is first guided horizontally and is then, with partial wrap-around of the circumference of one roll of a horizontal pair of nip rolls, passed through the nip of this pair and thereafter guided vertically upwardly. A certain amount of coating liquid is enclosed in the tubing cavity above the nip of the pair of rolls. The exposure to heat, in order to dry the layer on the inside of the tubing, takes place after the tubing is pressed flat in the nip of a pair of nip rolls.

German Offenlegungsschrift No. 2,801,038 discloses a process for the internal coating of tubing made of plastic or of a dense fabric which is continuously passed through the nip of a vertical pair of nip rolls. The tubing, in flattened form, is fed to the pair of rolls, in an upwardly-inclined direction before entering the metering nip of the pair of rolls. The tubing first rests, in flattened form, partially against the circumference of the lower roll of the pair of rolls and after issuing from the metering nip, rests in flattened form partially against the upper roll. After the flattened tubing has been lifted off the surface of the upper roll of the pair of rolls, it proceeds in an upwardly-inclined direction. The coating liquid is contained in the portion of tubing which viewed in the direction of travel of the tubing, is upstream of the pair of nip rolls.

The known processes for the internal coating of cellulose hydrate tubing with aqueous polymeric dispersions all have the disadvantage that the cellulose hydrate tubes which, because of the high water content of the polymeric dispersions used, are heavily moistened with water, tend on subsequent drying to undergo an undesirable change of dimension due to shrinkage.

Further, all the known processes have the disadvantage that because of the use of aqueous polymeric dispersions having a relatively low content of dispersed polymer, the layer of aqueous polymeric dispersion on the inside of the tubing runs freely off the inside—since the low viscosity of the dispersion means that it flows easily. As a result, the film coating on the inside of the tubing, which is formed from this layer of dispersion after expulsion of the dispersing medium therefrom and fusion of the dispersed component by the action of heat, is non-uniform, and the amount of water which, in order to form the film coating on the inside of the tubing by exposing the tubing to heat, has to be expelled and transported outwardly through the tubing wall by diffusion, is large in relation to the amount of the dispersed polymeric component of the dispersion.

The known processes accordingly are disadvantageous in energy terms, and furthermore, lead to a non-uniform film coating on the inside of the tubing.

SUMMARY OF THE INVENTION

It is an object of the present invention to provide a process for forming a uniformly thick uninterrupted coating on the inside of cellulose hydrate tubing, using an aqueous liquid containing a chemical substance capable of forming a coating, as the coating liquid, which can be carried out in an advantageous manner with respect to energy consumption.

It is another object of the present invention to provide a process which permits precise metering of the coating liquid and allows internal coating in which there is virtually no run-off.

Another object of the present invention is to provide a process for forming a uniformly thick uninterrupted film coating of a naturally occurring or synthetic polymer on the inside of cellulose hydrate tubing, using an aqueous polymeric dispersion as the coating liquid, having a relatively high concentration of dispersed polymeric component and which can be carried out in an advantageous manner with respect to energy consumption.

In order to accomplish the foregoing objects in accordance with the present invention, there has been provided a process for coating the inside of a length of tubing essentially consisting of cellulose hydrate, comprising the steps of forming at least one loop of tubing with a downwardly inclined portion and an upwardly inclined portion; filling the cavity of the tubing forming the loop with a coating liquid; transporting the tubing along its longitudinal axis in a substantially vertically upward direction to coat the inside surface of the tubing above the level of the coating liquid with an initial layer of coating liquid; constricting the tubing adjacent to and above the level of the coating liquid with a metering device having a constriction zone which flattens a portion of the tubing passing therethrough to substantially eliminate all of the initial layer thereon and partially flattens the remaining portion of the tubing to allow a desired quantity of coating liquid to remain on the tubing issuing from the constriction zone; filling the cavity of the tube issuing from the constriction zone with support gas; and exposing the tubing to the action of heat at a sufficiently high temperature to fuse the coating layer to the inside thereof and form an uninterrupted film of uniform thickness on the inside of the tubing.

In accordance with the present invention, the process further comprises gradually flattening the tubing along a conically-shaped zone running in the direction of travel of the tube prior to its entry into the metering device to prevent creasing of the tubing.

In accordance with yet another aspect of the invention, the process further comprises the step of preventing the coating liquid present in the tubing loop from flowing in a direction counter to the direction of travel of the tubing and simultaneously replenishing the coating liquid in the tubing loop.

In accordance with the present invention, there is provided an apparatus for coating the inside of a length of tubing comprising means for forming at least one loop of tubing having a downwardly inclined portion and an upwardly inclined portion; means for filling the cavity of the tubing forming the loop with a coating liquid; means for transporting the tubing in a substantially vertically upward direction above the tubing loop; a metering device having a constriction zone formed by a pair of rotatable elements positioned on either side of the tubing, at least one of said elements having a circumferential surface with raised portions separated by recess; and a heater subsequent to the metering device.

In accordance with the present invention, the rotatable elements of the metering device comprise a pair of rotatable rolls positioned on either side of the tubing and having circumferential surfaces, at least one circumferential surface including raised portions thereon.

In accordance with yet another aspect of the present invention, the apparatus further comprises means for progressively flattening the tubing as it enters the metering device wherein the flattening means comprise a pair of stationary guide elements positioned on either side of the tubing having mutually facing substantially flat surfaces which progressively converge towards one another.

In accordance with yet another aspect of the present invention, the rotatable elements of the metering device comprise a pair of endless belts positioned on either side of the tubing and having substantially straight mutually facing surfaces which progressively converge towards one another.

In accordance with a further aspect of the present invention, the apparatus includes means for preventing the coating liquid present in the tubing loop from flowing in a direction counter to the direction of travel of the tubing and simultaneously replenishing the coating liquid in the tubing loop.

Further objects, features and advantages of the invention will become apparent as the description proceeds, with particular reference to the drawings.

DETAILED DESCRIPTION OF PREFERRED EMBODIMENTS

Figure 1:
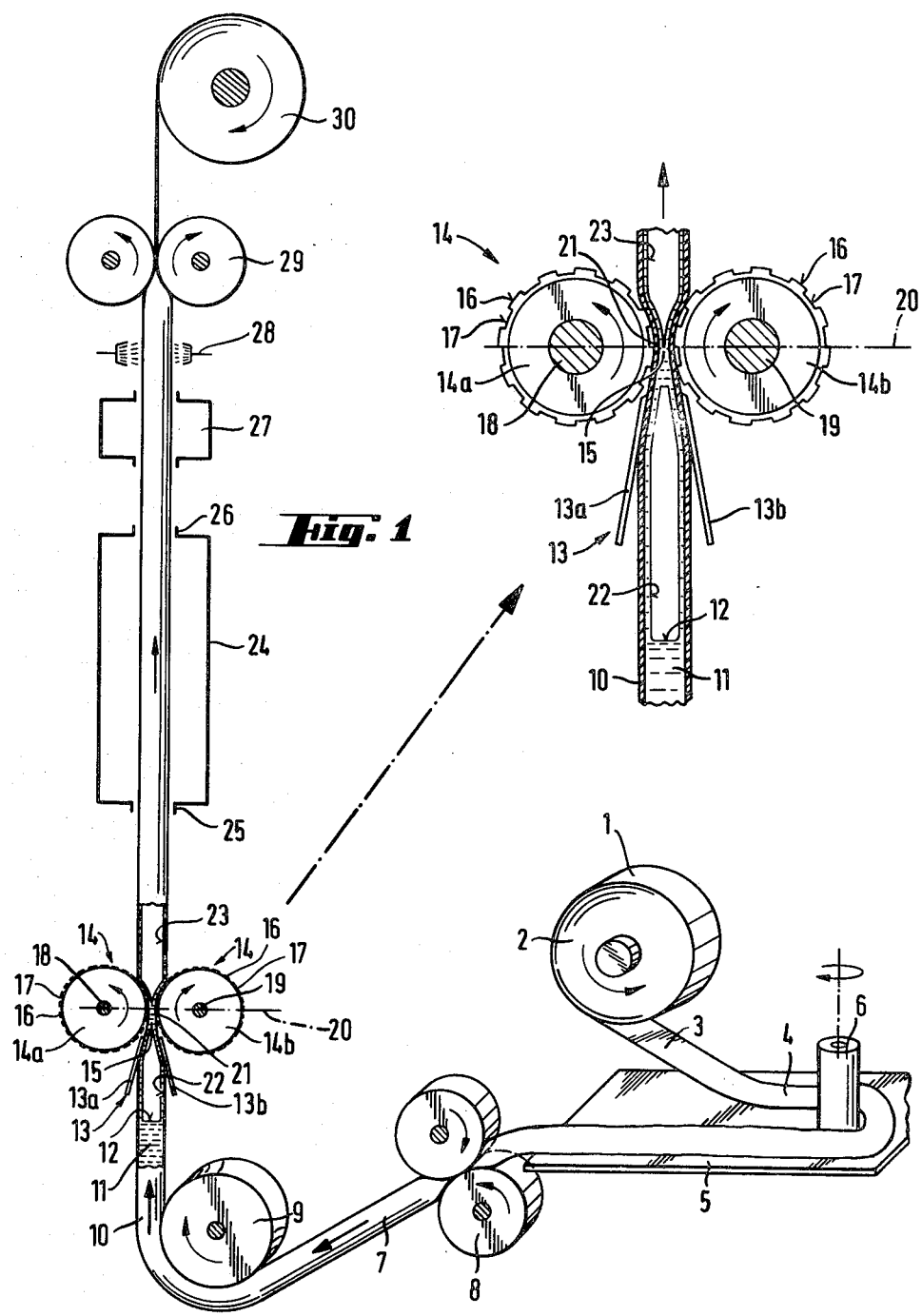
FIG. 1 is a schematic representation of one embodiment of the present invention.

In the text which follows, a horizontal pair of rolls is to be understood as a pair of rolls having axes of rotation substantially transverse to the direction of transportation of a substantially vertical portion of the tubing; and arranged so that a common, substantially horizontal plane can pass through the parallel axes of its rolls. A horizontal nip is understood to be the nip which is defined by the mutually facing outer surfaces of parallel-spaced rolls of a pair of rolls arranged as just stated. The nip extends transverse to the direction of transportation of the substantially vertical portion of the tubing.

In carrying out the process, the tubing is transported continuously and at a constant speed in the direction of its longitudinal axis. In the text which follows, the movement of the tubing will, for brevity, be referred to as "transportation".

The transportation of the tubing can, for example, be effected by passing the tubing, after drying and cooling but before winding up, continuously through the nip of a pair of rotatable squeeze rolls, which are of drivable construction and are, for example, driven by means of motors.

The process is carried out by transporting the tubing at a speed which is advantageously in the range of about 8 to 60 m/min. A speed of transportation of the tubing in the range of about 20 and 40 m/min is particularly advantageous.

An aqueous polymeric dispersion containing a high proportion of dispersed polymer relative to the amount of dispersing medium is used to carry out the process. Relative to the total weight of the aqueous dispersion, the dispersed polymer comprises at least about 15% of the total weight of the aqueous dispersion. Preferably, the aqueous polymeric dispersions contain an amount in the range from about 20 to 60% by weight, and more preferably about 30 to 40% by weight, of dispersed polymer, in each case relative to the total weight of the dispersion.

Aqueous polymeric dispersions suitable for carrying out the process are especially those wherein the dispersed polymer forms a water impermeable and water vapor impermeable film after expulsion of the dispersing medium by sufficient heat and fusion of the dispersed component. Preferred aqueous polymeric dispersions contain, as the dispersed polymeric component, copolymers having a preponderant proportion of copolymerized vinylidene chloride. Advantageously, the polymer components of these dispersions contain at least about 75% by weight of copolymerized vinylidene chloride. More preferred polymeric dispersions are those, having the stated concentration, which contain, as the dispersed polymer component, copolymers which are described in German Auslegeschrift No. 2,512,995 and German Pat. No. 2,512,994, the disclosures of which are hereby incorporated by reference. The polymers and polymeric dispersion are not, per se, a subject of the present invention.

The cellulose hydrate tubing, which is used to carry out the invention and is preferably fiber-reinforced, advantageously has a swelling value in the range of about 120 to 140%.

The cellulose hydrate tubing, for example, has a wall thickness in the range of about 30 to 300 $\mu$m, advantageously in the range of about 80 to 120 $\mu$m.

Fiber-reinforced cellulose hydrate tubing is to be understood as tubing which contains a fiber web embedded in its wall. The fiber insert in the tubing wall does not hamper the diffusion of water through the wall.

The preferred fiber-reinforced cellulose hydrate tubing advantageously has, in its wall, a water content in the range from about 8 to 12% by weight, relative to the total weight of the tubing, and a content of about 18 to 24% by weight, advantageously of about 22% by weight of a chemical agent capable of plasticizing cellulose hydrate, for example, glycerol, glycol or polyglycol.

The percentage by weight data in each case relate to the total weight of the fiber-reinforced cellulose hydrate tubing.

The cellulose hydrate tubing described above, which is preferably fiber-reinforced and contains a chemical plasticizer and water, is not, per se, a subject of the present invention.

Within the scope of the present description, the definition of the term "cellulose hydrate tubing" according to the present invention, includes both tubing comprising cellulose hydrate in the gel state, which has not yet been subjected to a drying process and which contains the above-mentioned proportion of chemical agent, capable of plasticizing cellulose hydrate, of the stated chemical composition and in the stated amount, as well as cellulose hydrate tubing which has already been subjected to a drying process and contains the stated proportion of water and plasticizer of the stated type and carries, on its surface, an adhesion-promoting layer of a chemical agent which is permeable to water and water vapor. The adhesion-promoting layer is a water-insoluble reaction product of epichlorohydrin and a polyamine-polyamide formed by heat curing. For example, the layer has a thickness corresponding to a weight per unit area in the range of about, advantageously, 30 to 100 mg/m$^2$ of substrate surface. The adhesion-promoting layer insures that polymeric film is firmly bonded to the substrate surface of the tubing when performing the process according to the present invention.

The stated tubing of cellulose hydrate in the gel state, and the stated tubing of cellulose hydrate possessing an adhesion-promoting layer of a chemical substance on its surface, are hereinafter referred to as the "initial tubing". This tubing in each case represents the starting material for the process. Advantageously, the initial tubing is in each case fiber-reinforced.

For example, there is described and used as the initial tubing or process starting material an advantageously fiber-reinforced cellulose hydrate tubing which has a swelling value of about 120 to 140%, for example, of about 130%; a water content of about 8 to 12% by weight, for example, of about 10% by weight; a glycerol plasticizer content of about 18 to 24% by weight, for example, of about 22% by weight; and a water-permeable and water vapor-permeable, thin adhesion-promoting surface layer of a chemical substance, for example, a layer having a thickness corresponding to about 30 to 100 mg/m$^2$ of a water-insoluble reaction product of epichlorohydrin and a polyamide-polyamide on the inside.

The process in accordance with the present invention provides a polymer film coating on the inside of the end product of the process (the process product) having a thickness corresponding to a weight per unit area in the range of, advantageously, about 8 to 20 g of polymer per m$^2$ of substrate surface, preferably about 10 to 15 g of polymer per m$^2$ of substrate surface.

The film coating is physically homogeneous, uniformly thick and uninterrupted.

The process according to the present invention is described below by way of the following example. An apparatus for carrying out the process is also described.

The initial tubing, for example, has a diameter of 90 mm, with a flattened width of 143 mm.

A long piece of the tubing, for example, a length of 350 m, is wound in flattened form on a rotatably constructed stock drum mounted in a fixed position.

The tubing is continuously supplied from the stock reel and is transported in its longitudinal axial direction to form a loop of tubing, having a downwardly inclined portion and an upwardly inclined portion. The loop is formed, for example, with the use of a rotatably constructed guide roller. The tubing is then transported in an upward direction, at a substantially constant speed, for example, of about 20 to 40 m/min. The cavity of the tubing forming the tubing loop is filled with a predetermined amount of aqueous dispersion of a polymer, for example, about 10 liters of dispersion. The concentration of the dispersion, for example, is about 30% polymer by weight. The dispersed polymeric component, for example, comprises about 88% by weight of copolymerized vinylidene chloride, about 3% by weight of copolymerized acrylic acid, about 4% by weight of copolymerized acrylonitrile, and about 5% by weight of copolymerized methyl acrylate. The percentages by weight in each case relate to the total weight of the dispersed copolymer. A dispersion of the stated concentration can be prepared, for example, by starting from a dispersion which contains a relatively high concentration of a dispersed polymeric component, for example, 55% by weight of dispersed copolymer, and bringing it, by dilution with water, to a desired concentration appropriate for performing the process.

The amount of aqueous polymeric dispersion required to coat the inside of the total length of cellulose hydrate tubing with a polymeric film coating is introduced into the tubing at the start of the process so that the cavity of the vertical portion of the tubing loop is partially filled with coating liquid. Adjacent to and above the level of the coating stock contained in the vertical portion of the tubing loop, the tubing is continuously passed through the profiled metering nip of a metering device having rotatable and rotating metering elements, which laterally delimit the metering nip of predetermined width. At least one of the metering elements has a profiled circumferential surface.

In the text which follows, the term "tubing with support gas in the tubing cavity" relates to the tubing issuing from the metering nip of the metering device in a substantially vertically upward direction and which includes a thin liquid layer of aqueous polymeric dispersion on the inside thereof.

The wording "tubing with support gas in its cavity and a thin liquid layer of aqueous polymer dispersion of a given concentration on its inside" is defined to embrace the portions of the tubing which have been inflated with support gas and have a circular or virtually circular cross-section. Air is the preferred gas.

The shape of the inflated tubing is ensured by filling the tubing with support gas having a pressure adequate to maintain the cross-sectional dimensions. In the case of tubing having a substantially circular cross-section filled with support gas, the pressure of the support gas can be such that slight radial stretching of the tubing results.

To prevent the support gas in the tubing cavity from forcing the stock of coating liquid in the tubing loop counter to the direction of travel of the tubing and towards the stock reel, it is advantageous if the tubing, filled with stock liquid, is continuously pressed flat in the direction of travel of the tubing, before the tubing is deflected in a substantially vertical direction by the guide roller. For example, this is achieved by passing the tubing continuously through the nip of a pair of rotatably mounted rolls which press the liquid-filled tubing together. Advantageously, the rolls flatten the downwardly inclined portion of the tubing loop and simultaneously replenish the coating liquid in the tubing loop used for the internal coating of the tubing. To maintain a constant liquid level in the vertical portion of the tubing, the coating liquid is replenished at a rate equal to its consumption. This combined effect can, for example, advantageously be achieved by passing the tubing through the nip of a cooperating pair of conveyor belts having profiled or embossed outer faces, as described in German Pat. No. 2,659,000 or No. 2,557,994, the disclosure of which are hereby incorporated by reference.

The width of the metering nip of the metering device corresponds to approximately twice the tubing wall thickness.

A thin liquid layer of aqueous polymeric dispersion on the inside of the tubing filled with support gas is to be understood as a layer which is thinner than the layer which is present on the inside of the substantially vertically guided tubing before the latter enters the metering nip of the pair of metering rolls. After expulsion of the dispersing medium from the thin liquid layer and fusion of the dispersed component by the action of heat at an adequately high temperature, an uninterrupted, uniformly thick film coating is formed having a thickness corresponding to a weight per unit area of about, advantageously, 8 to 20 g of polymer per m$^2$ of substrate surface. The relative balance of the said process parameters can be determined, for each individual case, in a simple manner by a small number of simple preliminary experiments as will be apparent from the following.

The continuous transportation of the tubing through the profiled metering nip of the metering device causes the aqueous dispersion to build up in the tubing cavity immediately before the metering nip. The speed of transportation of the tubing and the concentration of the aqueous polymeric dispersion determine the amount of coating liquid trapped in the metering nip.

The tubing issuing from the metering nip inflates with support gas and bears a thin layer of aqueous polymeric dispersion. As the tubing is led vertically upwardly and exposed to the action of heat, the dispersing medium of the thin liquid layer on the inside of the tubing diffuses outwardly through the tubing wall and the dispersed component fuses to form an uninterrupted polymeric film coating on the inside of the tubing.

The exposure of the tubing to heat, so as to dry the liquid layer of aqueous dispersion on the inside of the tubing filled with support gas, is effected, for example, by passing the tubing substantially vertically upwardly through a straight drying tunnel. The tunnel, for example, is equipped with infrared heating elements arranged so that at the start of the drying tunnel the tubing is heated to a temperature, for example, of about 80° C., while at the end of the tunnel it is heated to a temperature of, for example, about 140° C.

Before exposure to heat, the tubing is advantageously passed through a gas or air zone, for example, a zone having a length in the range of 50 to 100 cm. The surrounding gas in the region of the zone is typically at room temperature.

Advantageously, the tubing is caused to vibrate lightly, in the region of the gas zone, by means of a vibration device, in order to render uniform the thin liquid layer on the inside of the tubing.

The amount of support gas required in the cavity of tubing issuing from the metering nip of the metering device is introduced into the tubing cavity at the beginning of the process. The internal pressure in the tubing is maintained during the process, by continuously flattening the tubing, after the polymer film coating has formed, along a narrow zone which extends across the entire width thereof. For example, the tubing is passed through the nip formed by a pair of squeeze rolls.

The circumferential speed of the driven rolls of the pair of squeeze rolls is in the range of about 8 and 60 m/min. For example, the rolls have a circumferential speed at about 30 m/min. The circumferential speed of the rolls of the pair of squeeze rolls determines the speed of transportation of the tubing.

After drying the tubing by exposing it to heat, forming a film coating on its inside and then cooling the latter to the point that the film coating is non-tacky, but before pressing the cooled tubing flat in the nip of a pair of squeeze rolls, the tubing is optionally moistened with water, for example, by spraying therewith, and is thereby advantageously brought to a water content in the range of about 8 to 12% by weight, for example, to about 10% by weight, in each case relative to the total weight of the tubing.

The process product is then wound up on a reel which is designed to be rotatable and drivable, and which is driven.

The phrase "metering device with a profiled, horizontal metering nip, which is delimited by rotatable, rotating elements, the outside of at least one of these being of profiled construction" embraces, by definition, a pair of rolls having parallel axes of rotation substantially transverse to the direction of travel of the substantially vertical portion of the tubing. The circumferential surface of at least one roll has a profiled or embossed surface. The immediately adjacent, opposite and facing parts of the circumferential surfaces of the rolls conjointly delimit a nip space which is referred to as a profiled metering nip.

Alternatively, the metering device is formed by a pair of endless belts, at least one endless belt having an embossed or profiled outer face. The nip space is formed by the mutually facing and progressively converging straight pairs of the outer faces of the endless belts, and in the region of its minimum width, is hereinafter referred to as the profiled metering nip.

When the metering nip is formed by a pair of metering rolls, preferably both rolls are of the same diameter and have circumferential surfaces of profiled construction.

It is understood that the profiled surface comprises a surface having a structure formed from a plurality of discrete part-surfaces, each separated from one another by recesses. The part-surfaces are of equal height and constitute that portion of the roll surface which exerts a pressure on the outer surface of the tubing. According to the present invention, the sum of the area of the raised part-surfaces can be substantially less than the total surface area of the recesses extending between the raised portions of the rolls.

The upper faces of the raised part-surfaces are each concave and are each uniformly curved, the curvature corresponding to the curvature of the circumference of the roll.

The base of the recess also has a concave curvature corresponding to the curvature of the roll.

Preferably, the upper faces of the raised portions are all of the same shape and size.

The distance from the base of the recess to the upper face edge of the adjoining raised portion determines the depth of the recess and the amount of aqueous dispersion which is allowed to pass through the metering nip.

Preferably, the raised portions conjointly form a geometrically regular grid. Accordingly, the roll surface can comprise a grid-like construction.

In a preferred embodiment, the metering device comprises metering rolls having surfaces of identical profiled construction. The grid-like construction of the roll surfaces can be formed, for example, by engraving the roll surfaces with a desired grid pattern.

The grid-like construction of the roll surfaces can, for example, by comprised of a plurality of raised portions arranged in a regular manner relative to one another and having preferably circularly bounded upper faces. Alternatively, the roll surfaces can be comprised of a plurality of straight dam-like raised portions with concavely curved upper faces, which advantageously run parallel to one another and each extend in an axially parallel manner over the entire length of the circumferential surface. The dam-like raised portions are preferably free from interruptions. Further, the roll surfaces can also be profiled to bear a net-like grid.

In carrying out the process, the directly adjacent mutually facing upper faces of the raised portions of the metering rolls cooperate in the metering nip.

In the preferred embodiment of the pair of metering rolls, the rolls bear an identical surface profile and are arranged so that in the region of the metering nip, corresponding upper faces of the raised portions of the rolls are directly adjacent to one another, as are the corresponding orifices of the recesses of the rolls.

The rolls of the metering roll pair each have the same external diameter.

The profiled metering rolls are each of rotatable construction, and drivable. The rolls are driven by means of motors or the like in a direction of rotation corresponding to the direction of transportation of the tubing. Further, the metering roll pair is mounted as a unit, in a fixed position.

The width of the metering nip, that is to say the distance between directly adjacent mutually opposite upper faces of raised portions of the metering rolls, corresponds to approximately twice the wall thickness of the tubing which is passed through the metering nip.

The metering rolls rotate in the same direction and at the same speed. In the region of the metering nip, directly adjacent, mutually facing, cooperating upper surfaces of the raised portions of the rolls frictionally contact the outer faces of the tubing, transported continuously through the substantially horizontal metering nip, so that opposite inner faces of the tubing tough directly.

The total number, shape and dimension of the raised portions of the roll surfaces cooperating in the metering region, together with the number, shape and dimension of the recesses between the raised portions, determine the amount of aqueous polymeric dispersion which, when the tubing is passed through the metering nip, is deposited on the inside of the tubing issuing from the nip.

In a preferred embodiment, the total recessed surface area of the grid is substantially larger than the sum of the area of the raised portions. The raised portions only serve to scan the tubing wall thickness while the recesses permit the passage of the dispersion. It follows that the thinner the desired coating thickness for a given solids content of the dispersion, and the lower the proportion of the area occupied by the upper faces of the raised portions, the shallower the recesses must be. The required dimensions can be determined mathematically.

Corrections which might possibly be required can be determined with little experimental effort. Example:

The desired coating is 13 g/m². The wall thickness of the tubing on passage through the roll nip is to be 100 μm. The solids content of the dispersion is 25%.

It follows that the thickness of the dispersion film between the layflat tubing in 100 μm, and as the tubing leaves the nip and is inflated, this film uniformly distributes itself over the inner face of the tubing.

As the proportion of the surface accounted for by the raised portions approaches zero, it follows that to allow the appropriate amount of dispersion to pass, the depth of the recesses must be 100 μm if there is a grid on one roll, and 50 μm if there is a grid on both rolls. If the blockage due to the raised portions is, for example, 4%, the depth must be increased by 4-5%, which is generally negligible. In most cases, a correction is only needed if the blockage exceeds 10%.

However, the blockage by the raised portions can also be compensated by increasing the depth of the recesses to such an extent that the additional amount of dispersion which is allowed to pass is exactly the same as that which is prevented from passing through the metering nip by the raised portions of the metering rolls. As a result of the thicker application of dispersion, more rapid leveling results, and hence evening-out of the layer, occurs after the tubing has passed through the metering nip.

The recesses are chosen to allow exactly as much dispersion to pass through as is necessary to form a layer of the desired thickness of aqueous polymeric dispersion on the inside of the tubing. The concentration of the dispersion is chosen so that the dispersion no longer freely runs off, but is still sufficiently liquid that the grid points which, due to the action of the raised portions, have not been provided with a film are covered with dispersion as a result of leveling. Leveling can be assisted by mechanical action from outside, for example, by vibration of the tubing.

It is particularly advantageous to construct a pair of metering rolls in such a way that one of the two rolls is adjustably set, relative to the other, by means of a stop, so that the metering nip has a width which corresponds to approximately twice the intended thickness of the tubing wall and so that at least one of the rolls of the pair can be brought up against the stop under adjustable pressure.

In an alternative embodiment of the process, the tubing is fed to the profiled metering nip of the pair of rolls by gradually flattening the tubing below the metering nip as viewed in the direction of transportation of the tubing, employing a pair of sheet-like guide panels, facing one another in a parallel manner. The guide panels define a nip space that progressively narrows towards the metering nip of the pair of rolls. The tubing is passed substantially vertically upwardly through this space and towards, and into, the metering nip of the pair of rolls. In the course thereof, the outer faces of the tubing come into contact with the mutual facing surfaces of the mutually converging guide panels, so that the tubing is thereby continuously and progressively laid flat in a virtually crease-free manner, and enters the metering nip of the pair of rolls in this condition.

To prevent creasing of the tubing as it enters the metering nip, it is understood by one skilled in the art, that means customary in the manufacture of extruded synthetic plastic tubing can be employed which gradually convert the tubing from an inflated state to a flattened state. For example, in addition to the above described guide plates, roll conveyors, conveyors or guide rolls which define a space which conically converges towards the metering nip can be used.

In yet another embodiment, the metering device comprises a pair of endless belts which form a substantially horizontal metering nip, in which at least one endless belt possesses an outer face of profiled construction. The adjacent mutually facing outer surfaces of straight zones of the belts conjointly delimit a nip space, the width of which progressively diminishes from one end thereof to the other. The distance between the mutually opposite immediately adjacent outer faces of the endless belts in each case determine the width of the nip space of the pair of endless belts.

The broadest zone of the nip space is referred to as the nip space entry and the narrowest zone as the nip space exit. The zone of narrowest width of the nip space is referred to as the profiled metering nip of the pair of endless belts. The parts of the profiled outer faces of the endless belts which delimit the nip space of the pair of endless belts, mutually correspond in constructional design, and are always in congruent arrangement to one another.

The endless belts are of a conveyor-belt type and conjointly form the pair of endless belts. The belts are arranged symmetrically to one another to form a conical space having an axis of symmetry which is substantially parallel to the direction of transportation of the tubing. Adjacent and mutually facing parts of the belts progressively converge towards the metering nip and each progressively converges towards the longitudinal axis of symmetry of the conical space. As a result, the distance between the mutually opposite adjacent outer faces of the belts progressively varies in the sense that it is greater, in the region of the nip space entry, than the diameter of the tubing, while in the region of the nip space exit it corresponds to the requisite width of the metering nip. The nip space entry is at the lower end, and the nip space exit at the upper end of the metering device, the metering device being fixed in the space in such a manner that its longitudinal axis of symmetry runs substantially vertically.

The width of the metering nip is chosen so as to correspond to approximately twice the wall thickness of the tubing. Mutually cooperating raised portions on the outer faces of the belts virtually flatten the tubing transported through the metering nip, in the region of the latter, so that on the inner face of the tubing leaving the metering nip a thin liquid layer of aqueous polymer dispersion of the stated concentration forms, which, after expelling the dispersion medium and fusing the dispersed component by exposure to heat, leads to a polymeric film coating, on the inside of the tubing, whose thickness corresponds to a weight per unti area in the range of advantageously, about 8 to 20 g of polymer per m² of substrate surface.

In carrying out the process using the metering device in the form of the pair of endless belts just described, the tubing is transported substantially vertically upwardly and enters, above the level of the portion of coating liquid contained in the vertical length of tubing, into the nip space of the pair of endless belts. At the nip space entry, the tubing passes vertically upwardly through the nip space in such a way that the longitudinal axis of the tubing virtually corresponds to the longitudinal axis of symmetry of the pair of endless belts, and, on passing through the nip space on its way to the metering nip, is progressively flattened by continuous contact of the outer tubing surfaces with mutually facing outer surfaces of the endless belts to insure passage through the profiled metering nip in a creasefree condition.

Feeding the tubing to the metering nip of the metering device according to the invention under conditions which prevent creasing of the tubing, achieved by progressively flattening the tubing before the latter enters the metering nip, is particularly advantageous when using tubing of large width, for example, having a diameter of 120 mm.

The outer profiled faces of the endless belts of the pair of belts are constructed with an identical geometrically regular structure over their entire length and entire width.

The term "of profiled construction" here has the same meaning as that given in the description characterizing the profiled circumferential surfaces of the rolls of the metering roll pair described hereinabove. The conveyor-like belts of the pair of endless belts are preferably of equal length, each comprising a belt which is continuous in itself and having a width which at least corresponds to the width of the flattened tubing.

Each endless belt of the pair of belts possesses integrally two straight parts, preferably running parallel to one another, whose inner surfaces face one another, and each possesses two opposite, semi-circularly curved belt regions. The lateral faces of the endless belts are in pair-wise alignment.

The endless belts are flexible and made from material which gives the belts sufficient dimensional stability, such as a plastic, rubber, thin metal or the like. The rigid-shaped guide rollers, advantageously, are made from a metal or a plastic, for example, a polyamide.

The endless belts each possess a pair of guide rollers, preferably of identical size, which cooperate with the endless belt. The inner faces of the curved parts of the endless belts are each partially in contact with the circumference of the guide rollers, with frictional force transmission in the contact region. The guide rollers of each belt are each centrically fixed on axles which are each rotatably mounted. One of the axles of each pair of rollers is constructed to be drivable, for example, by coupling the end of the axle to a motor. The axles of the guide rollers of each endless belt of the pair of belts all run substantially transverse to the direction of travel of the substantially vertical portion of the tubing, and are parallel to one another. Preferably, the axles are substantially horizontal.

The endless belts, of the pair of belts, are arranged, relative to one another so that in each case the upper roller of the pair of guide rollers of one belt of the pair of endless belts forms a roller pair with the upper roller of the pair of guide rollers of the other endless belt, a common substantially horizontal plane passing through the axes of the roller pair. In referring to the upper guide roller of a pair of guide rollers, the term "upper" relates to the upper end of the longitudinal axis of symmetry of the pair of endless belts.

Preferably, the inner faces of the endless belts, and the circumferential faces of the guide rollers, have an oppositely matching surface structure, which is of such construction that it intensifies the frictional force-transmission contact between the two surfaces.

The endless belts of the pair of belts are each driven at the same circumferential speed and in opposite circumferential directions. The profiled construction of the surface of one endless belt is identical with the profiled construction of the surface of the other.

In order to maintain a substantially constant distance between the level of coating liquid enclosed in the cavity of the tubing loop and the pair of metering rolls of the metering device during the coating operation, it is advantageous to first form at least one loop of tubing filled with coating liquid wherein the longitudinal axis of the tubing loop lies in a substantially horizontal or slightly inclined plane before forming the straight, vertically upwardly-travelling part of the tubing. The tubing loop plane is, for example, situated a short distance below the substantially horizontal plane which passes through the roll axes of the pair of metering rolls according to the first process variant, or the horizontal plane in which the longitudinal dimension of the metering nip of the pair of endless belts lies according to the second process variant. A planar support surface for the horizontal tubing loop can take the form of a support plate and is preferably slightly inclined so that the liquid in the tubing loop seeks to run in the direction of transportation of the tubing. The support plate can be fixed to a frame.

To replenish the coating liquid as it is used, a pair of rolls or conveyors as disclosed in German Pat. Specification No. 2,659,000 or No. 2,557,994, can be used to maintain a constant liquid level. Moreover, they provide the additional advantage of preventing the supply of coating liquid from flowing in a direction counter to the direction of transportation of the tubing.

In order to be able to guide the tubing, which is constantly transported in the direction of its longitudinal axis, so that it forms a substantially horizontal tubing loop on the support plate, at least one rotatably constructed deflecting roller is rotatably fixed on the upper face of the support plate. The axis of rotation of the roller forms a substantially right-angle with the plane of the plate.

To form a horizontal tubing loop, the tubing filled with coating liquid is guided so that its outer face partially adjoins the circumference of the guide roll and so that the latter changes the direction of the tubing, forming a loop.

The pieces of apparatus appropriate for carrying out the process according to the invention each also comprise the requisite devices for holding the individual elements of the apparatus in a fixed position.

It is characteristic of the process carried out according to the invention that over the period of time in which the cellulose hydrate tubing is in contact with aqueous polymeric dispersion of the stated concentration, the amount of water absorbed from the dispersion by the tubing or the amount of water which diffuses from the liquid layer into the tubing is only such that the water content in the cellulose hydrate tubing is always less than that which corresponds to the swelling value (water-retention capacity) of the cellulose hydrate tubing.

The water content of the tubing when carrying out the process amounts, preferably, to about 20 to 30% of the swelling value and, more preferably, to only about one-quarter of the amount of water which corresponds to the swelling value of the initial tubing (the swelling value is determined in accordance with DIN 53,814; "Faerbereiund textilchemische Untersuchungen" ("Investigations in Dyeing and Textile Chemistry"), A. Agster, page 450, Springer Verlag 1967, 10th edition).

The advantages of the invention, resulting from what was been described above, over the prior art are shown by the following comparisons:

To produce a film coating, for example, of a thickness corresponding to a weight per unit area of 10 g of polymer per m$^2$ of substrate surface, it is necessary, in the known process, when using an aqueous polymeric dispersion of the customary concentration of, for example, 6.5% by weight of dispersed polymer, to expel 143.8 g of water per m$^2$ of substrate surface by the action of heat on the tubing, in order to form the desired film coating.

On the other hand, to form a film coating of a thickness corresponding to 10 g of polymer per m$^2$ of substrate surface on the inside of the tubing, it is only necessary, when carrying out the procedure according to the present invention and using, for example, a 30 percent strength by weight polymeric dispersion, to expel 23.3 g of water per m$^2$ of substrate surface by the action of heat on the tubing in order to form the film coating.

The process according to the invention, in all its variants, accordingly, only requires, for the production of a polymeric film coating of a thickness corresponding to 10 g of polymer per m$^2$ of substrate surface, one-sixth of the amount of thermal energy which is necessary to form a film coating of the same thickness when carrying out the known coating processes.

Furthermore, because of the small amount of water to be expelled from the liquid layer of aqueous polymeric dispersion in order to form a polymeric film on the inside of the tubing, the process according to the invention permits a substantial increase in the coating speed.

In the process according to the invention, coating defects are avoided, due to the high content of dispersed polymer comprising the dispersion for the following reasons: using, as the process starting material, cellulose hydrate tubing having a swelling value (water retention capacity) of, for example, about 120%, it is necessary, in the prior art processes, when using, for example, a 6.5 percent strength by weight aqueous polymeric dispersion, and carrying out the process so as to form a film coating corresponding to a thickness of, for example, 10 g of polymer per m$^2$ of substrate surface, that the tubing absorbs 143.8 g of water per m$^2$ of tubing and that this amount should be transported, by diffusion, through the tubing wall.

In contrast, when carrying out the process according to the present invention and using a polymer which, for example, contains 30% by weight of dispersed polymer component, the initial tubing, having the stated swelling value of about 120%, is only moistened slightly.

Since, in order to form the uninterrupted polymeric film coating on the inside of the tubing by expelling the dispersing medium from the liquid layer of aqueous polymeric dispersion on the inside of the tubing, the entire amount of water in the liquid layer must be transported away by outward diffusion through the tubing wall, and the rate of diffusion and the water content of the liquid layer of aqueous dispersion essentially determine the speed with which the coating process can be carried out.

The advantages of the process according to the invention, in its embodiments, are briefly summarized below:

1. Use of an aqueous polymeric dispersion having a high content of dispersed polymer; energy-saving process operation; possibility of carrying out the process at a speed which is twice to four times as great as the coating speed in known processes.

2. No free run-off of the aqueous dispersion.

3. Controlled metering and evening-out of the dispersion applied; defects due to run-off are avoided.

4. Accumulation of plasticizer in the dispersion reserve has only an insignificant effect on the quality of the film coating, because of the high content of dispersed component.

5. Because of the use of an aqueous polymeric dispersion having the stated content of dispersed polymer and of dispersion medium, and because of precise metering in the metering nip of the device, the desired coating thickness is virtually independent of the diffusion properties of the initial tubing.

6. Starting from a given amount of initial tubing to be coated on its inside with a film coating of a given thickness, the process is substantially easier to carry out than the known coating processes, because of the lower total amount of aqueous dispersion required for internal coating of the piece of tubing; with this lower total requirement, when coating very long pieces of tubing by the process according to the present invention, the coating liquid requires replenishment at substantially longer intervals of time than in the case of known processes, and the waste tubing produced by the tubing incision which has to be made for such replenishment is substantially reduced.

7. An apparatus is also proposed for the simultaneous replenishment of the coating liquid and the prevention of coating liquid flow counter to the direction of transportation of the tubing.

Examples of both embodiments of the process, and of the apparatus suitable for carrying these out, are described below, in relation to the drawings.

In FIG. 1, 1 denotes a stock reel with tubing 2 rolled up thereon. A piece of tubing 3 is drawn off the stock reel 1 and transported in the direction of the longitudinal axis of the tubing to form a horizontal tubing loop 4 that rests on a support 5 having a rotatable deflecting roller 6 attached to the upper face thereof.

A piece of tubing 7, which extends in the downwardly inclined direction of travel of the tubing, is flattened by a pair of rolls 8 which replenish the coating liquid 11 and prevent the back flow of the coating liquid 11 into tubing loop 4. A deflecting roller 9 guides a piece of tubing 10 vertically upwardly so that the coating liquid 11 in the cavity of the tubing comes up to a level 12 in the vertical piece of tubing 10. A pair of guide panels 13 comprising guide panels 13a and 13b, gradually flatten the tubing as it approaches a horizontal pair of rolls 14. The pair of rolls 14 comprise rolls 14a and 14b which form a metering nip 15. The surfaces of the rolls 14a and 14b are profiled or embossed and include raised portions 16 and recesses 17. The rolls 14a and 14b have axes of rotation 18, 19, respectively, through which a horizontal plane 20 passes. A piece of tubing 21, before entering the region of the metering nip 15, carries a liquid layer 22 of aqueous polymeric dispersion on the inside thereof. A liquid layer of aqueous polymeric dispersion 23 is formed on the inside of the tubing after issuing from the metering nip 15 and is exposed to heat in a drying tunnel 24, such as a hot air heater, having an entry port 25 and an exit 26. The dried tubing is then passed through a cold air bath 27 before passage through a spray device 28 for exposing the dried tubing to water. A pair of squeeze rolls 29 flatten the dried tubing for storage on a rotatably constructed stock reel 30 which is driven by means of a motor or the like.

Figure 2:
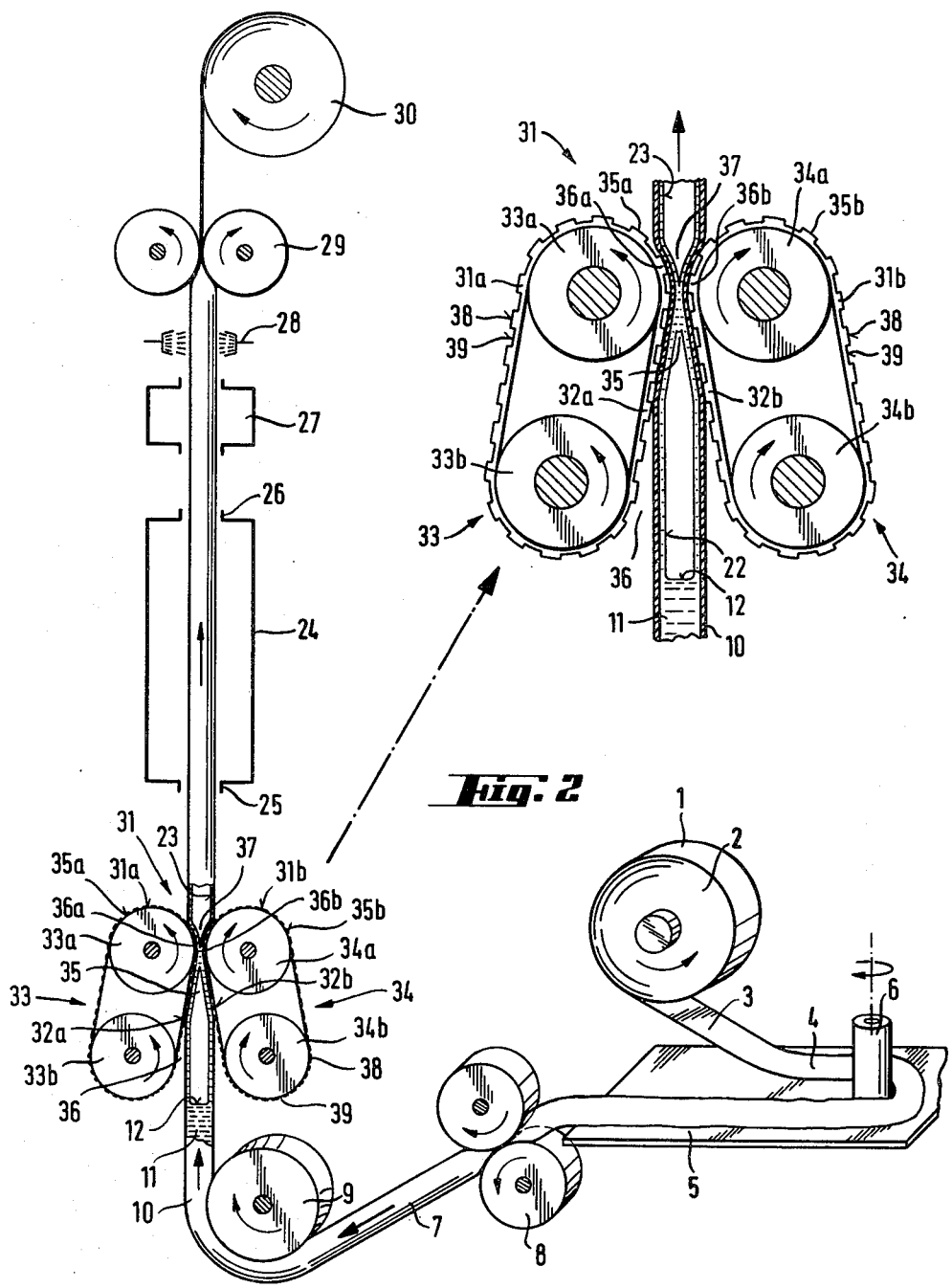
FIG. 2 is a schematic presentation of yet another embodiment of the present invention.

In FIG. 2, the numerals 1 to 12 and 22 to 30 have the same meaning as in FIG. 1.

In FIG. 2, the numeral 31 denotes a cooperating pair of endless belts comprising a first endless belt 31a and a second endless belt 31b, wherein 32a is a straight portion of the first endless belt, 32b a straight portion of the second endless belt, 36a is a curved portion of the first endless belt and 36b a curved portion of the second endless belt. Reference numerals 33a and 33b denote guide rollers 10 provided for the first endless belt. Similarly, the second endless belt is provided with guide rollers 34a, 34b. The guide rollers, respectively, form guide roller pairs 33 and 34. The endless belts 31a, 31b have embossed or profiled outer faces 35a, 35b, respectively. A nip space 35 formed by the pair of endless belts 31a, 31b progressively narrows in the direction of travel of the tubing and is delimited by the outer faces 35a and 35b. The entrance 36 of the nip space 35 is wider than the exit or profiled metering nip 37. The profiled construction of the outer faces 35a, 35b have raised portions 38 and recesses 39.

Other than in the profiles (16, 17, 38, 39) of the rolls (14a and 14b) or endless belts (31a and 31b) shown in FIGS. 1 and 2, in a preferred embodiment, a raised portion (16 and 38) on one roll (14a) or endless belt (31a) faces in the nip space the corresponding raised portion (16 and 38) on the opposite roll (14b) or endless belt (31b).

In order to simplify the drawing, the motors for driving the stock reel 30 and the guide rolls 33 and 34 are not shown. Further, the devices for holding the individual elements mentioned in a fixed position are not shown in the drawing.

While the invention has been particularly shown and described with reference to preferred embodiments thereof, it is understood by those skilled in the art that various changes in form and detail may be made therein without departing from the spirit and scope of the invention as defined by the appended claims.

What is claimed is:

1. A process for coating the inside of a length of tubing essentially consisting of cellulose hydrate, comprising the steps of:

forming at least one loop of tubing having a cavity therein with a downwardly inclined portion and an upwardly inclined portion;

filling the cavity of the tubing forming the loop with coating liquid;

transporting the tubing along its longitudinal axis in a substantially vertically upward direction to coat the inside surface of the tubing above the level of the coating liquid with an initial layer of coating liquid;

constricting the tubing adjacent to and above the level of the coating liquid with a metering device having a constriction zone which flattens a portion of the tubing passing therethrough to substantially eliminate all of the initial layer thereon and partially flattens the remaining portion of the tubing to allow a desired quantity of coating liquid to remain on the tubing issuing from the constriction zone;

filling the cavity of the tubing immediately upon issuance from the constriction zone with support gas in order to at least partially inflate the tubing; and exposing the tubing to the action of heat at a sufficiently high temperature to remove the coating liquid and to fuse the coating layer to the inside thereof and form an uninterrupted film of uniform thickness on the inside o the tubing.

2. A process as recited in claim 1, further comprising the step of:

leveling the quantity of coating liquid on the inside of the tubing issuing from the constriction zone before heating by transporting the tubing in a substantially vertical direction for a distance sufficient to insure a continuous coating layer of desired thickness on the inside of the tubing.

3. A process as recited in claim 1, further comprising the step of:

moistening the tubing after heating.

4. A process as recited in claim 1, wherein said coating liquid is an aqueous polymeric dispersion containing at least about 15% by weight of dispersed polymer relative to the total weight of the dispersion.

5. A process as recited in claim 1, wherein said coating liquid is an aqueous polymeric dispersion containing from about 15 to 60% by weight of dispersed plastic relative to the total weight of the dispersion.

6. A process as recited in claim 1, wherein the constriction step comprises:

passing the tubing through the metering device having a constriction zone formed by a pair of rotatable and rotating elements positioned on either side of the tubing, at least one element having a circumferential surface with raised portions separated by recesses.

7. A process as recited in claim 6, wherein the rotatable elements of the metering device comprise a pair of rotatable rolls positioned on either side of the tubing and having circumferential surfaces contacting the outer surface of the tubing, at least one circumferential surface including raised portions thereon.

8. A process as recited in claim 6, wherein the rotatable elements of the metering device comprise a pair of rotatable endless belts positioned on either side of the tubing and having circumferential surfaces which contact the outer surface of the tubing, at least one surface having raised portions thereon.

9. A process as recited in claim 6, 7, or 8, wherein the raised portions account for about 10 to 15% of the total circumferential surface.

10. A process as recited in claim 1, further comprising the step of:

gradually flattening the tubing along a conically shaped zone running in the direction of travel of the tube prior to its entry into the constriction zone.

11. A process as recited in claim 10, wherein the flattening step comprises:

passing the tubing between a pair of stationary guide elements positioned on either side thereof having mutually facing substantially flat surfaces which progressively converge towards one another.

12. A process as recited in claim 8, wherein the endless belts have mutually facing circumferential surfaces which progressively converge towards one another to progressively flatten the tubing passing therebetween as it enters the constriction zone of the metering device.

13. A process as recited in claim 1, further comprising the step of:

preventing the coating liquid present in the tubing loop from flowing in a direction counter to the direction of travel of the tubing.

14. A process as recited in claim 13, wherein the step of preventing coating liquid flow comprises:

flattening a part of the tubing loop.

15. A process as recited in claim 13, wherein the step of preventing coating liquid flow comprises:

partially flattening a part of the tubing loop and conveying the coating liquid in the tubing cavity upstream from the flattened part towards the metering device.

16. A process as recited in claim 1, wherein the step of transporting comprises:

transporting the tubing at a constant speed in the range of about 8 to 60 m/min.

17. A process as recited in claim 4, wherein the constriction step comprises:

passing the tubing through the metering device having a constriction zone of sufficient width to ensure an uninterrupted film as the inside of the tubing with a uniform thickness corresponding to a weight per unit area of about 8 to 20 g of dispersed component per $m^2$ of tubing surface.

18. An apparatus for coating the inside of a length of tubing comprising:

means for forming at least one loop of tubing having a cavity therein and having a downwardly inclined portion and an upwardly inclined portion;

means for transporting the tubing filled in the cavity of the loop with a coating liquid in a substantially vertically upward direction above the tubing loop;

a metering device, having a constriction zone formed by a pair of rotatable elements positioned on either side of the tubing, at least one of said elements having a circumferential surface with raised portions separated by recesses;

means for filling the cavity of the tubing immediately upon issuance from the constriction zone with support gas in order to at least partially inflate the tubing; and a heater positioned after said metering device.

19. An apparatus as recited in claim 18, further comprising:

means for cooling the tubing positioned upstream from said heater.

20. An apparatus as recited in claim 18, further comprising:

means for moistening the tubing positioned upstream from said heater.

21. An apparatus as recited in claim 18, wherein said rotatable elements of said metering device comprise a pair of rotatable rolls positioned on either side of the tubing and having circumferential surfaces contacting the outer surface of the tubing, at least one circumferential surface including raised portions thereon.

22. An apparatus as recited in claim 18, further comprising means for progressively flattening the tubing as it enters the said metering device.

23. An apparatus as recited in claim 22, wherein said flattening means comprises guide or conveyer elements positioned in front of said metering device on either side of the tubing, said elements comprising plates or rolls which progressively converge towards one another in the direction of said metering device for passing the tubing in a crease-free manner through said metering device.

24. An apparatus as recited in claim 18, wherein said rotatable elements of said metering device comprise a pair of endless belts positioned on either side of the tubing and having substantially straight mutually facing surfaces which progressively converge towards one another, at least one surface having raised portions thereon.

25. An apparatus as recited in claim 18, 21, or 24, wherein said raised portions account for about 10 to 15% of the total circumferential surface area.

26. An apparatus as recited in claim 18, including means for preventing the coating liquid present in the tubing loop from flowing in a direction counter to the direction of travel of the tubing.

27. An apparatus as recited in claim 26, wherein said preventing means comprises means for flattening a part of the tubing loop.

28. An apparatus as recited in claim 26, wherein said preventing means comprises a pair of endless belts positioned on either side of the tubing for partially flattening the tubing and conveying coating liquid upstream from said belts in the direction of travel of the tubing.

29. An apparatus as recited in claim 18, further comprising means for flattening the tubing after heating.

* * * * *